United States Patent
Benjamin et al.

(10) Patent No.: US 12,481,543 B2
(45) Date of Patent: Nov. 25, 2025

(54) CLOUD-DISTRIBUTED APPLICATION RUNTIME—AN EMERGING LAYER OF MULTI-CLOUD APPLICATION SERVICES FABRIC

(71) Applicant: VMware LLC, Palo Alto, CA (US)

(72) Inventors: Emad Benjamin, San Jose, CA (US); Pere Monclus, Santa Clara, CA (US); Diwan Chandrabose, Bangalore (IN); Abhijit Patharkar, Pune (IN); Abhirama Mallela, Bangalore (IN)

(73) Assignee: VMware LLC, Palo Alto, CA (US)

( * ) Notice: Subject to any disclaimer, the term of this patent is extended or adjusted under 35 U.S.C. 154(b) by 568 days.

(21) Appl. No.: 17/989,731

(22) Filed: Nov. 18, 2022

(65) Prior Publication Data
US 2024/0020185 A1    Jan. 18, 2024

(30) Foreign Application Priority Data
Jul. 18, 2022 (IN) .............................. 202241041046

(51) Int. Cl.
*G06F 9/54* (2006.01)
*H04L 9/40* (2022.01)

(52) U.S. Cl.
CPC .......... *G06F 9/547* (2013.01); *H04L 63/1416* (2013.01)

(58) Field of Classification Search
CPC .............................. G06F 9/547; H04L 63/1416

USPC ........................................................ 726/23
See application file for complete search history.

(56) References Cited

U.S. PATENT DOCUMENTS

| | | | |
|---|---|---|---|
| 11,997,130 B2 * | 5/2024 | Xu ...................... | H04L 63/1466 |
| 2019/0238561 A1 * | 8/2019 | McGloin ............... | G06F 21/554 |
| 2022/0417257 A1 * | 12/2022 | Behl .................... | H04L 63/1416 |
| 2023/0179569 A1 * | 6/2023 | Giralte ................ | H04L 63/1458 726/1 |
| 2023/0247003 A1 * | 8/2023 | Chanak ................ | H04L 9/3226 726/1 |

* cited by examiner

*Primary Examiner* — Teshome Hailu
(74) *Attorney, Agent, or Firm* — King Intellectual Asset Management

(57) ABSTRACT

A cloud distributed application runtime is deployed to execute a cloud infrastructure. During deployment of an application service by the cloud infrastructure, each action implemented in the cloud infrastructure is traced, from an initiation of the application service to a termination of the application service. Level objectives associated with the cloud infrastructure and associated with the application service deployed by the cloud infrastructure are tracked. In response to tracing an action implemented in the cloud infrastructure and in response to tracking the level objectives, a scaling decision associated with the application service is determined. The scaling decision incudes either an upscaling or a downscaling. In response to determining the scaling decision, the scaling decision is implemented to match the level objectives associated with the cloud infrastructure and associated with the application service.

20 Claims, 18 Drawing Sheets

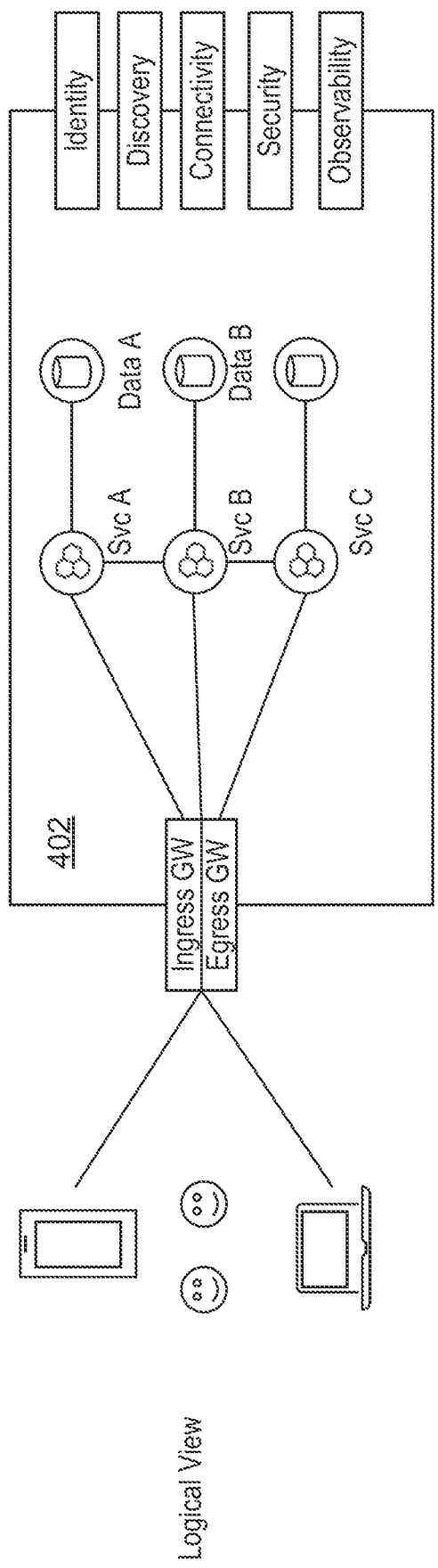
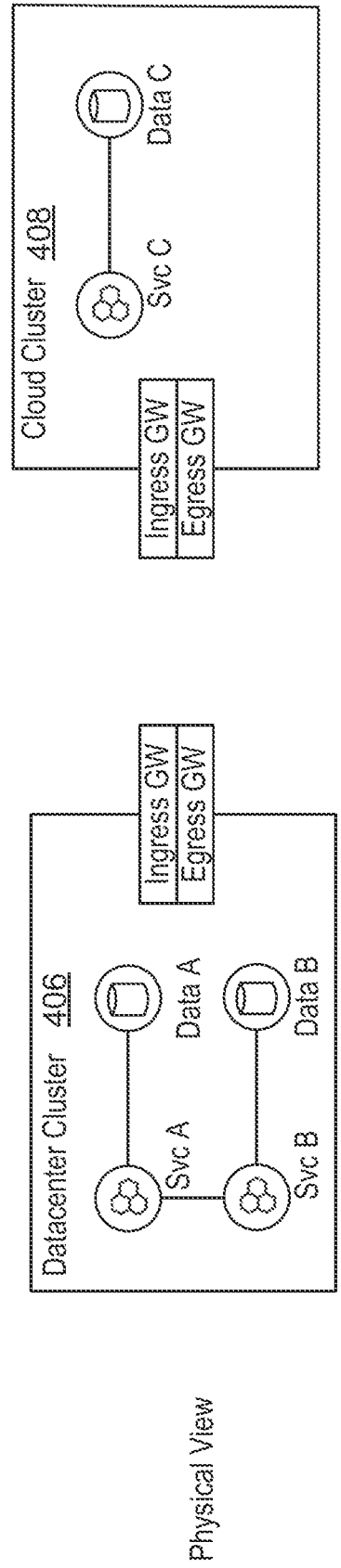
FIG. 4A
FIG. 4B

CLOUD-DISTRIBUTED APPLICATION RUNTIME—AN EMERGING LAYER OF MULTI-CLOUD APPLICATION SERVICES FABRIC

RELATED APPLICATIONS

Benefit is claimed under 35 U.S.C. 119(a)-(d) to Foreign Application Serial No. 202241041046 filed in India entitled "CLOUD-DISTRIBUTED APPLICATION RUNTIME—AN EMERGING LAYER OF MULTI-CLOUD APPLICATION SERVICES FABRIC", on Jul. 18, 2022, by VMware, Inc., which is herein incorporated in its entirety by reference for all purposes.

TECHNICAL FIELD

This disclosure relates to computer-implemented methods, computer-readable storage media and computer systems for deploying a cloud runtime, which includes common application services connectivity with various resiliency and geographic manageability functions.

BACKGROUND

Providers of cloud infrastructure must adhere to certain service level objectives (SLOs) for their users. Certain cloud infrastructures lack reliability and have complicated performance postures. Such providers want intelligent infrastructure systems that can observe application performance and implement automation to replace manual processes. The providers also want infrastructure systems that behave in accordance with the prescribed SLO by interpreting and adhering to the SLO in an automated way.

SUMMARY

This disclosure describes a cloud-distributed application runtime implemented to deploy multi-cloud application services.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 4A and 4B are schematic diagrams of a logical view and a physical view, respectively, of the global namespaces included in the runtime of FIG. 1.

Like reference symbols in the various drawings indicate like elements.

DETAILED DESCRIPTION

A content delivery network (CDN) is a group of servers, geographically distributed, working together to deliver Internet content at high speeds. Using a CDN, assets needed for loading Internet content (e.g., HTML pages, JavaScript files, stylesheets, images, and video) can be quickly transferred. Traditional CDN technologies focus on the first mile hop of the application. In cloud infrastructure, a runtime includes an operating system and software required to execute and/or compile code written for a specific programming language. This disclosure describes a runtime that, unlike traditional CDNs, focuses on the entire application including first and last mile hops in the application. The runtime described in this disclosure has the knowledge of all components of a cloud distributed application and can respond to performance and security issues by fixing the component that causes the issue. This feature of the runtime ensures faster and efficient self-healing of distributed application components.

The subject matter described here can be implemented as end-to-end transaction-based systems which allow setting objectives at a transaction level. Such systems can track an end-to-end transaction as a single recognizable unit called a Distributed Runtime Context. This transaction unit is tracked from the end user click to the last service. The runtime described in this disclosure can monitor these set transaction objectives and provide various remediations when these objections are not met. The subject matter described here can be implemented to add intelligent temporal resiliency thus making over-provisioning not the only option to guarantee service level agreements (SLAs). The subject matter described here can be implemented to remediate performance issues via efficient usage of available infrastructure. The subject matter described here provides a way to set common/shared objectives for the application in a cohesive fashion, thereby improving communication between teams to pinpoint actual problems in the application. By listening to signals from infrastructure, application services, transactions, external dependencies, edge, the subject matter described here can be implemented to appropriate remediating resiliency actions.

Figure 1:
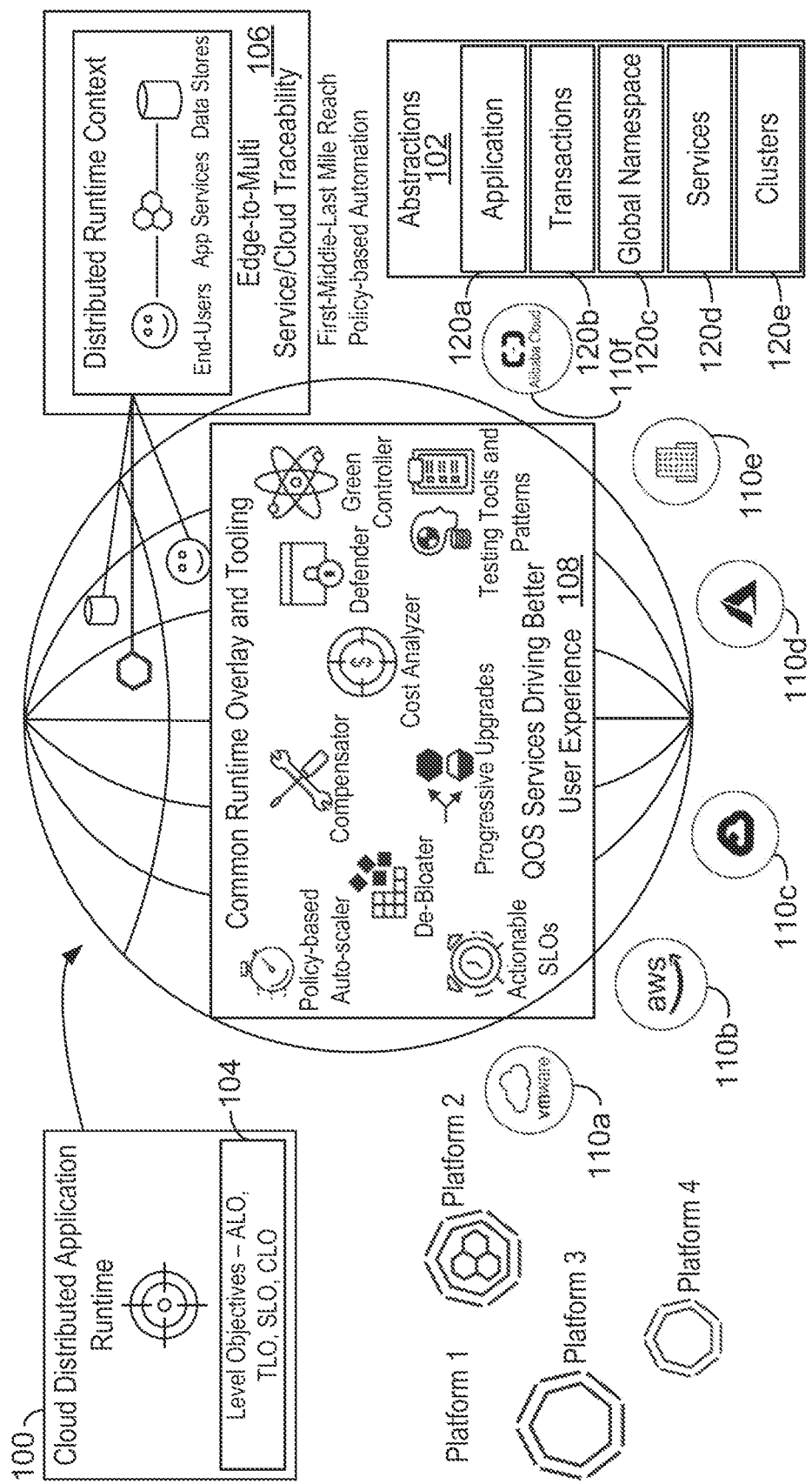
FIG. 1 is a schematic diagram of an example of a content delivery network runtime.

FIG. 1 is a schematic diagram of an example of a content delivery network runtime 100. The runtime 100 includes four top level components—Abstractions 102, Level Objectives 104, End-to-end traceability 106 and a set 108 of value-add services. The abstractions level includes abstractions such as Applications 102a, Transactions 102b, Global Namespaces 102c, Services 102d and Clusters 102e. The level objectives 104 includes the various abstraction levels including Application-Level Objectives (ALOs), Transaction Level Objectives (TLO s), Service Level Objectives (SLOs), Cluster Level Objectives (CLOs). The end-to-end traceability 106 tracks edge-to-cloud traceability. The set 108 are designed to enhance the application's user experience. Remaining components of the runtime 100 are built on top of the four top level components. In operation, envoy proxy is deployed at the edge and the cloud platform (e.g., Kubernetes®) is abstracted to services into an enterprise-class service mesh solution (e.g., Tanzu Service Mesh®) that provides reliable control and security for microservices, end users and data across clusters and clouds. In this manner, the runtime 100 can support multiple clouds (e.g., clouds 110a, 110b, 110c, 110d, 110e, 110f). Doing so involves the development of the runtime 100 as a layer that sits on top of various platforms, e.g., Velo Cloud®, Tanzu Service Mesh®, Tanzu Mission Control®, Tanzu Observability®. The runtime set of controllers can be stretched beyond providing cloud platform (e.g., Kubernetes®) services by integrating services that communicate using envoy proxy and being able to be casted as stateless or stateful services onto the runtime 100.

Figure 2:
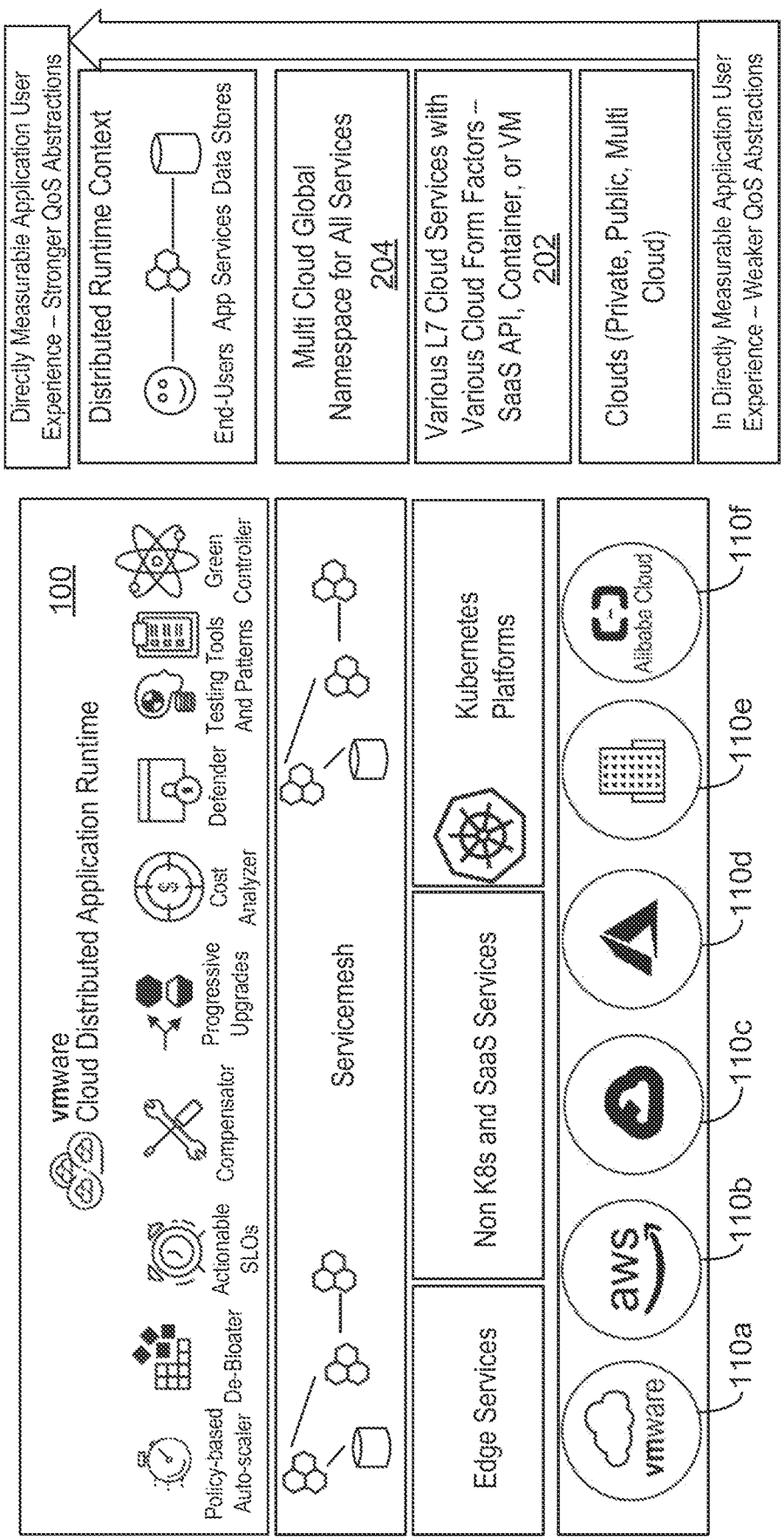
FIG. 2 is a schematic diagram showing how to build the abstraction layers of the content delivery network runtime of FIG. 1.

FIG. 2 is a schematic diagram showing how to build the abstraction layers of the content delivery network runtime 100. In the schematic shown in FIG. 2, the clouds 110a-110f form the bottom most layer of the runtime 100. Various cloud services 202 with various cloud form factors (e.g., SaaS, API, Container or VM) are layered above the clouds. The platforms 204 such as the Tanzu Service Mesh® are layered above the cloud services 202. The runtime 100 sits above the platforms 204. The components of the runtime 100 shown in FIG. 1 are described in further detail with reference to the following figures.

Figure 3A:
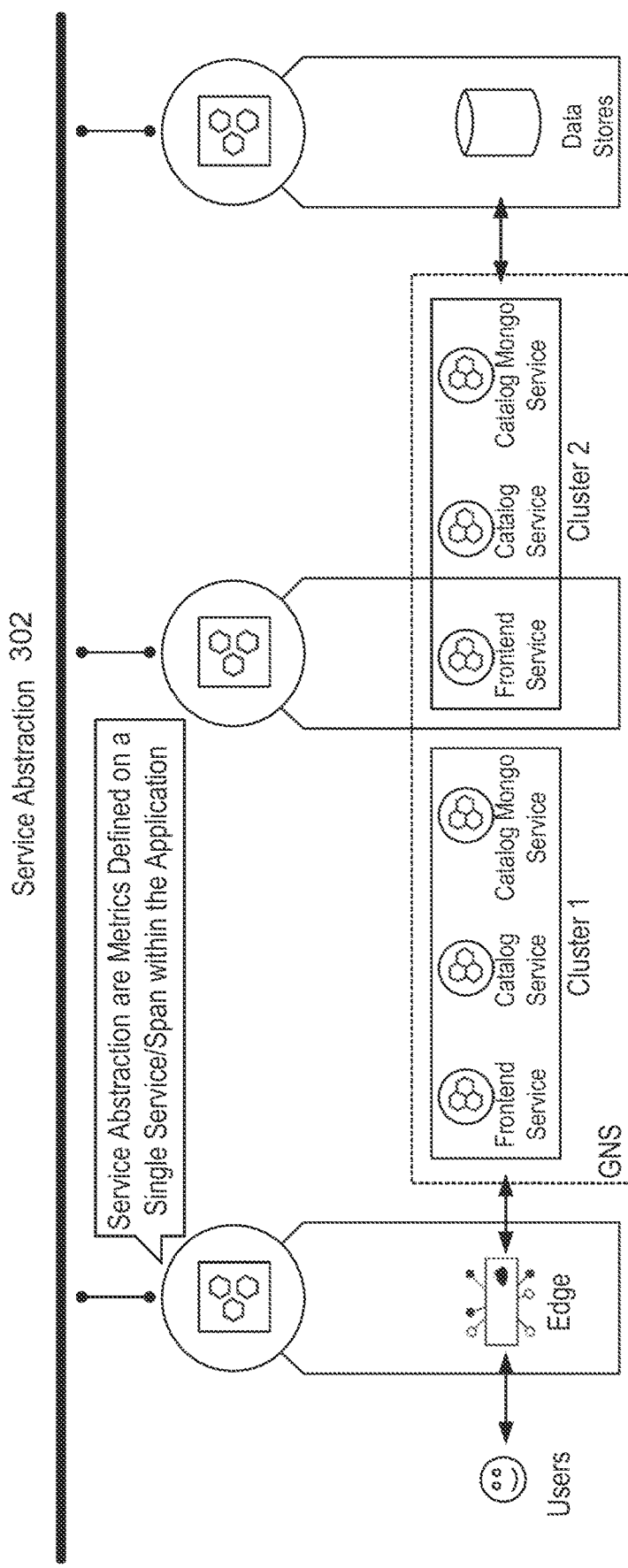
FIG. 3A is a schematic diagram of service abstraction included in the abstraction component of the runtime of FIG. 1.

FIG. 3A is a schematic diagram of service abstractions 302 included in the abstraction's component of the runtime 100 (FIG. 1). Service abstractions 302 are metrics defined on a single service/span within the application. For example, in a fitness application, the catalog service/frontend service can be considered as a service abstraction. Additionally, any service/span beyond the application cluster, e.g., edge span, an external database service, can also be abstracted as a service.

Figure 3B:
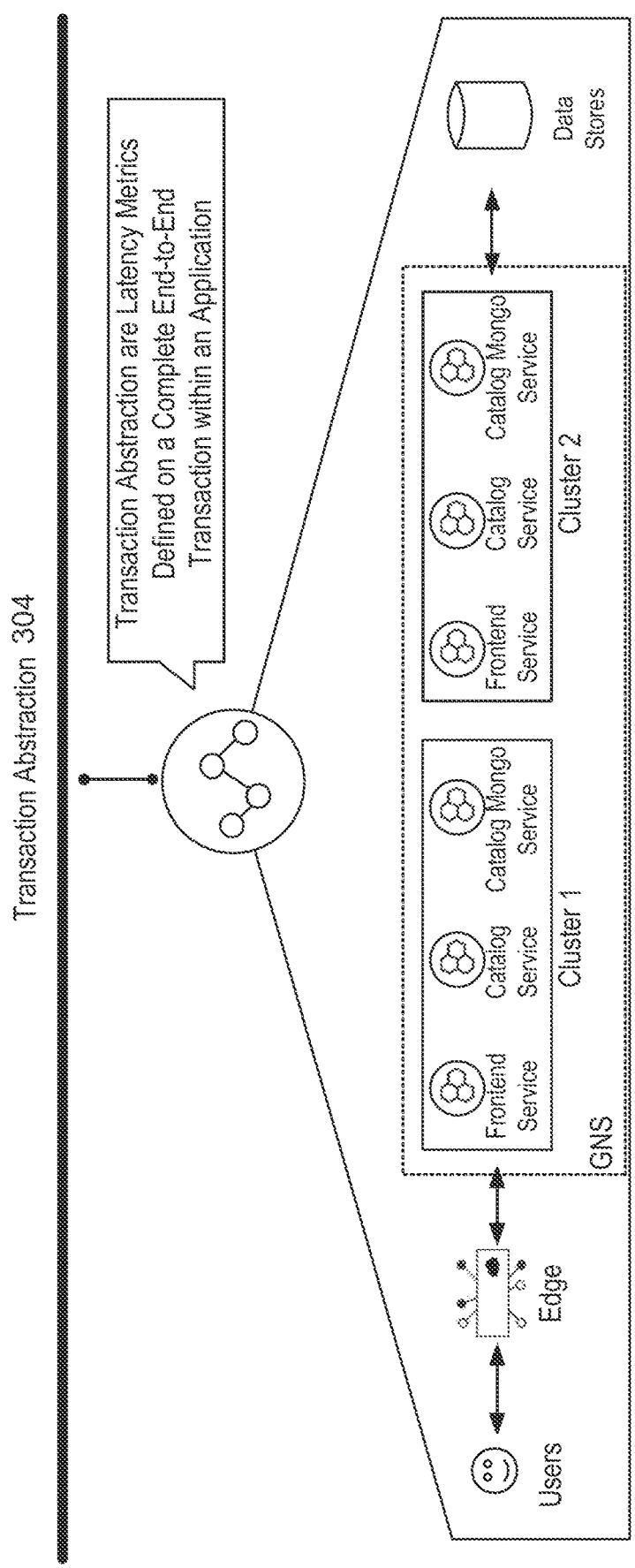
FIG. 3B is a schematic diagram of transactions abstraction included in the abstraction component of the runtime of FIG. 1.

FIG. 3B is a schematic diagram of transactions abstractions 304 included in the abstraction's component of the runtime 100 (FIG. 1). Transactions abstraction 304 are latency metrics defined on a complete end-to-end transaction within an application. End-to-end means that the transaction is traced right to the point of user action origination. An overall transaction can include multiple transactions, some of which are more critical than others. The latency/failure tolerance of the more critical transactions is less compared to that of comparatively less critical transactions.

Figure 3C:
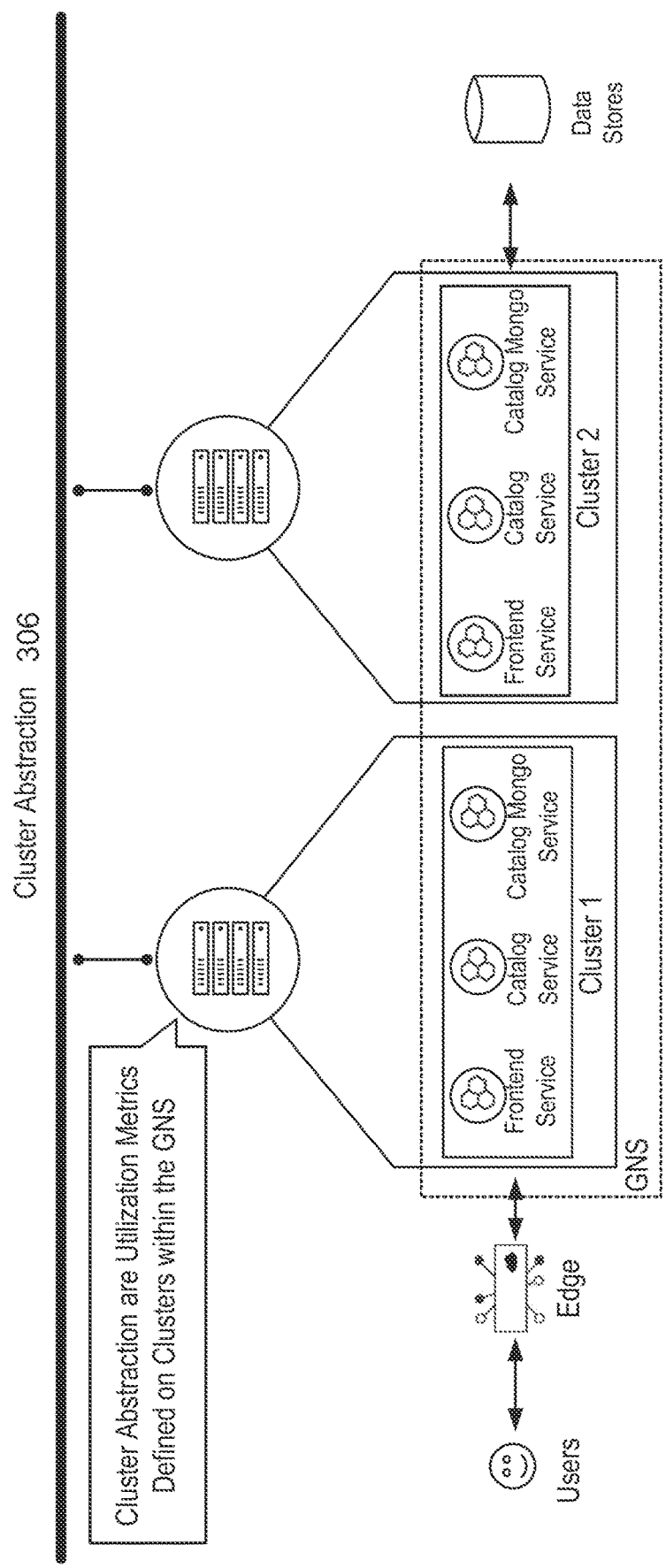
FIG. 3C is a schematic diagram of cluster abstraction included in the abstraction component of the runtime of FIG. 1.

FIG. 3C is a schematic diagram of cluster abstractions 306 included in the abstraction's component of the runtime 100 (FIG. 1). Cluster abstractions 306 are utilization metrics defined on clusters within the global namespace (GNS). Deployment of healthy clusters is needed to ensure that the application is running smoothly. An application can be spread across one or multiple clusters.

Figure 3D:
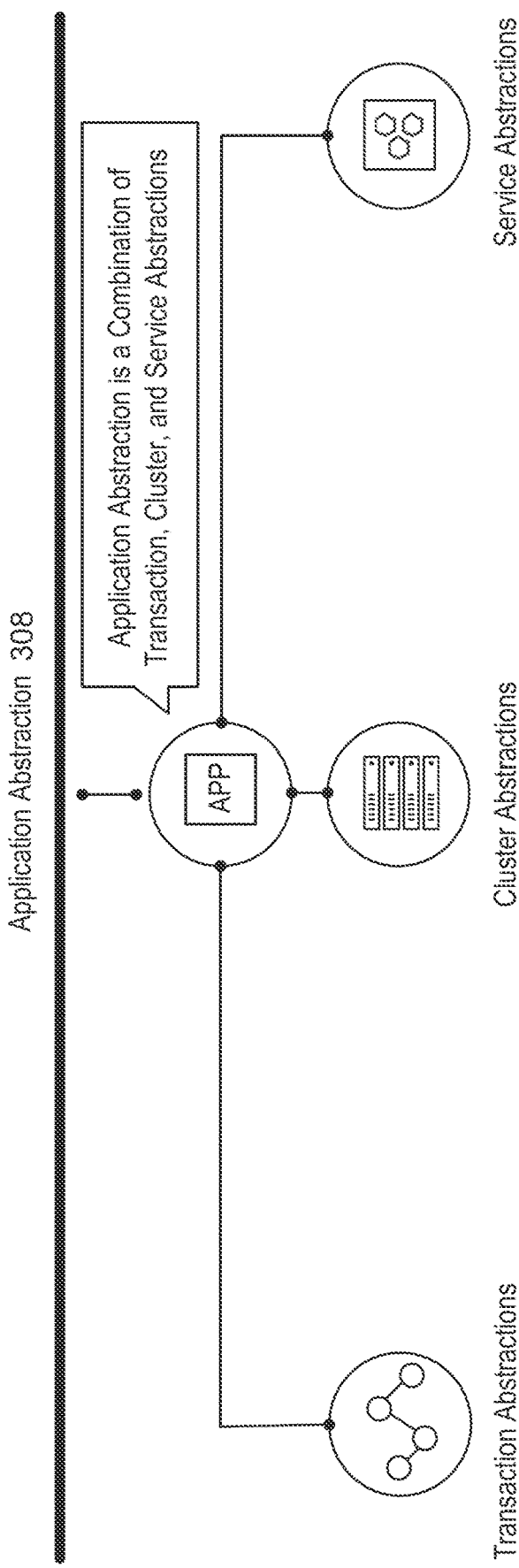
FIG. 3D is a schematic diagram of application abstraction included in the abstraction component of the runtime of FIG. 1.

FIG. 3D is a schematic diagram of application abstractions 308 included in the abstraction's component of the runtime 100 (FIG. 1). The application abstraction 308 is a collection of transaction abstraction 304, cluster abstraction 306 and services abstraction 302, and is associated with an Application-Level Objective (ALO) that depicts the overall application resiliency that an application can tolerate.

FIGS. 4A and 4B are schematic diagrams of a logical view and a physical view, respectively, of the global namespaces included in the runtime of FIG. 1. A global namespace (GNS)/application domain is a virtual group of resources between two or more clusters (e.g., a datacenter cluster 404 and a cloud cluster 406). Hierarchically, the GNS 402 is not sitting above or below the clusters but is rather a grouping of their resources to connect them. By grouping the resources, the GNS creates an illusion that the resources are in the same cluster. Alternatively, the application boundaries within the multi-cluster realm is the GNS 402, and an application of the GNS 402 is an application domain. In the runtime 100, the application is considered to be a one-to-one mapping with the GNS 402.

Figure 5:
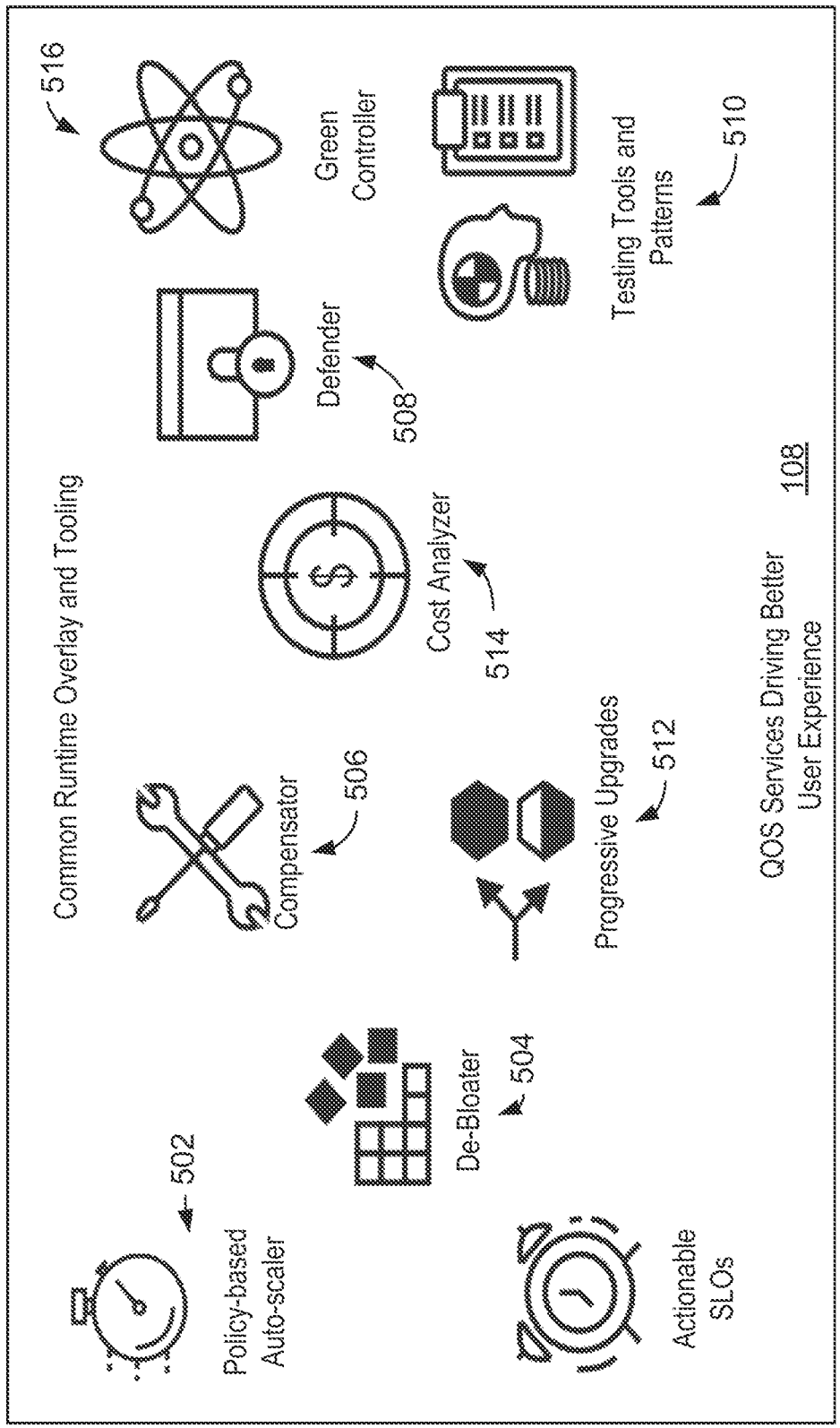
FIG. 5 is a schematic diagram of the set of value-add services included in the runtime of FIG. 1.

FIG. 5 is a schematic diagram of the set 108 of value-add services included in the runtime 100 (FIG. 1). The set 108 includes a policy-based auto-scaler component 502 that gives the user an ability to scribe an auto-scaling policy with metrics and thresholds that will trigger scaling or descaling actions. In some implementations, the user can scribe a SLO, and the runtime 100 can track the behavior of this SLO, and scale or descale, as needed, while also honoring the scaling limits and methods as scribed in the auto-scaling policy. The auto-scaler 502 gives the user the ability to control the distributed system with some predictability of application response times. The auto-scaling policy applies to service abstraction in general. In some implementations, different auto-scaling policies can be applied across different versions of a service owing to the differences in the performance characteristics of the service and the traffic split.

The auto-scaler component 502 has the following sub-components. The target service sub-component is the service (version) to which the auto-scaling policy applies. The scaling mode sub-component allows the auto-scaler component 502 to function in multiple modes including a performance mode, an efficiency mode and a scheduled mode. In the performance mode, the auto-scaler component 502 scales up service instances to meet an increase in demand without scaling down instances when the demand decreases. In this mode, service instances are scaled up to optimize for speed and performance. The performance mode is implemented to handle certain stateful services, like in-memory database, which, once scaled out, tend to remain scaled out. In the efficiency mode, the auto-scaler component 502 scales service instances up and down to meet various changes in demand. In this mode, services are scaled up and down to optimize efficient use of infrastructure resources. In the scheduled mode, the auto-scaler component 502 scales service instances up and down based on a preset time schedule.

In the performance and efficiency modes, the auto-scaler component 502 implements scaling actions based on configured trigger metric conditions. The auto-scaler component 502 takes scaling actions based on the configured trigger metric such as CPU or memory. The auto-scaler component 502 constantly monitors this metric, averaging the metric value over a configured period. When the average value fulfills configured metric threshold condition for scale-up or scale-down, the auto-scaler component 502 takes corresponding scaling action. The auto-scaler component 502 defines a minimum amount of time that must pass before a scale-down action happens after any scaling event. During the grace period, the auto-scaler component 502 does not initiate a scale-down if the last scaling action was within the grace time window. Scale-up actions are not affected by the grace period.

The auto-scaler component 502 defines instance scale attributes. For example, the auto-scaler component 502 defines minimum instances below which the component 502 will not allow the number of active service instances to drop at any point in time. Similarly, the auto-scaler component 502 defines maximum instances above which the component 502 will not allow the number of active service instances to rise. When scale up metric threshold conditions are met, the component 502 will scale up instances by a scale up steps number. Conversely, when scale down metric threshold conditions are met, the component 502 will scale down instances by a scale down steps number. When scale up and down step numbers are not configured, the component 502 determines a desired instance count that is proportional to the metric values observed. The component 502 defines a default number of instances to use in the absence of sufficient information on the service instances running. Such indeterministic conditions are termed as panic mode. In the panic mode, if the component 502 determines that the current number of instances is less than the default, then the component 502 triggers scaling up.

Figure 6A:
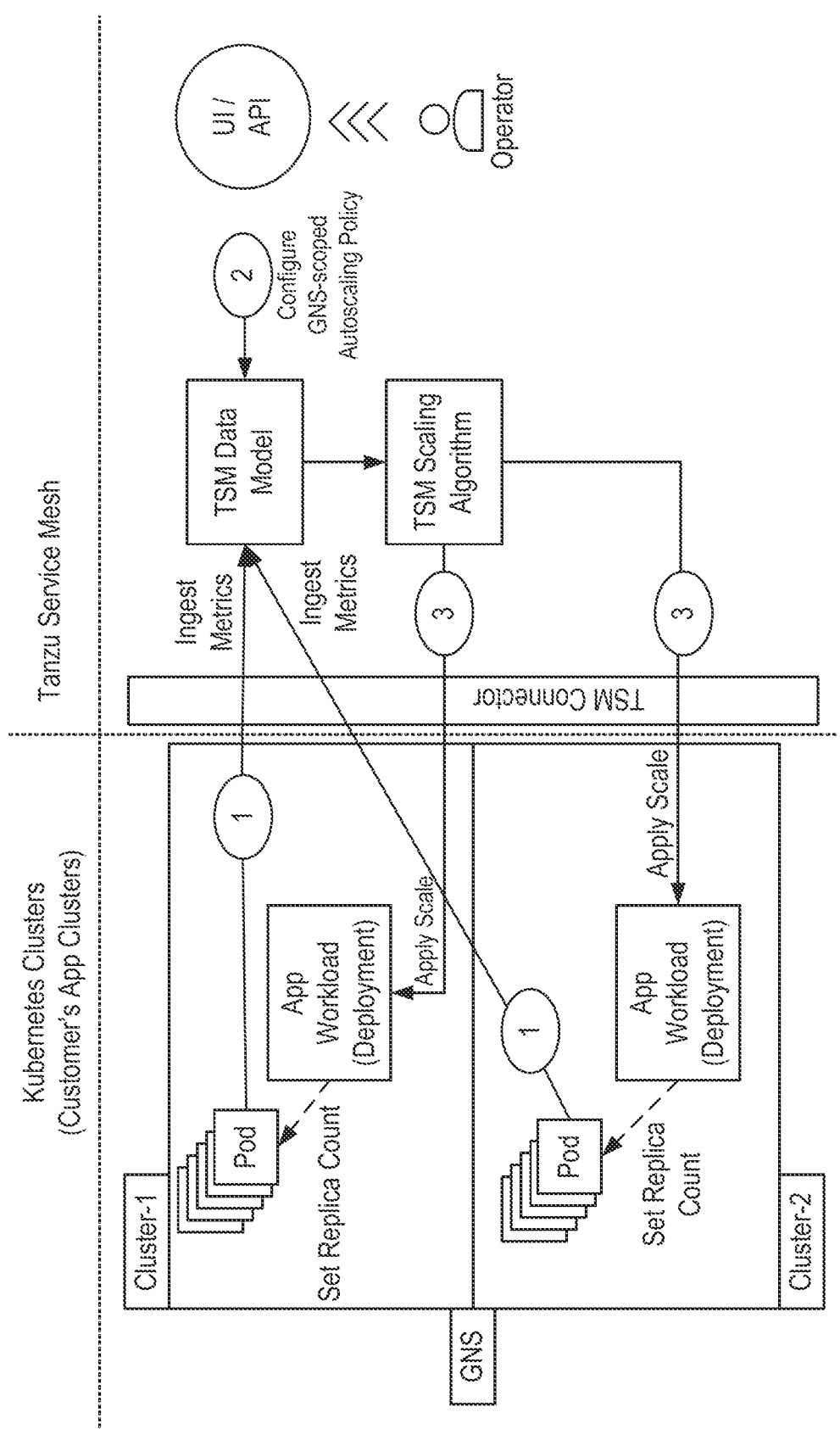
FIG. 6A is a schematic diagram of a global namespace scope autoscaling control workflow implemented by an auto-scaler component of the runtime of FIG. 1.

The auto-scaler component 502 can configure autoscaling policy for any service version in either a global namespace (GNS) scope or a cluster scope. FIG. 6A is a schematic diagram of a global namespace scope autoscaling control workflow implemented by an auto-scaler component 502. In the GNS scope, an autoscaling policy applies to the configured service version running in any infrastructure underneath the GNS. The runtime 100 provides API and UI to manage autoscaling policies in GNS scope. In GNS scoped auto-scaler, the operator configures a GNS Scoped autoscaling policy via the UI/API/CLI. This policy is defined centrally in a control plane. The desired metrics are ingested from all the clusters defined in a GNS into the data model in the control plane. The TSM Scaling Algorithm, consumes the metrics from the data model and applies scale to all the clusters in the GNS, thus making it a GNS scoped auto-scaler.

Figure 6B:
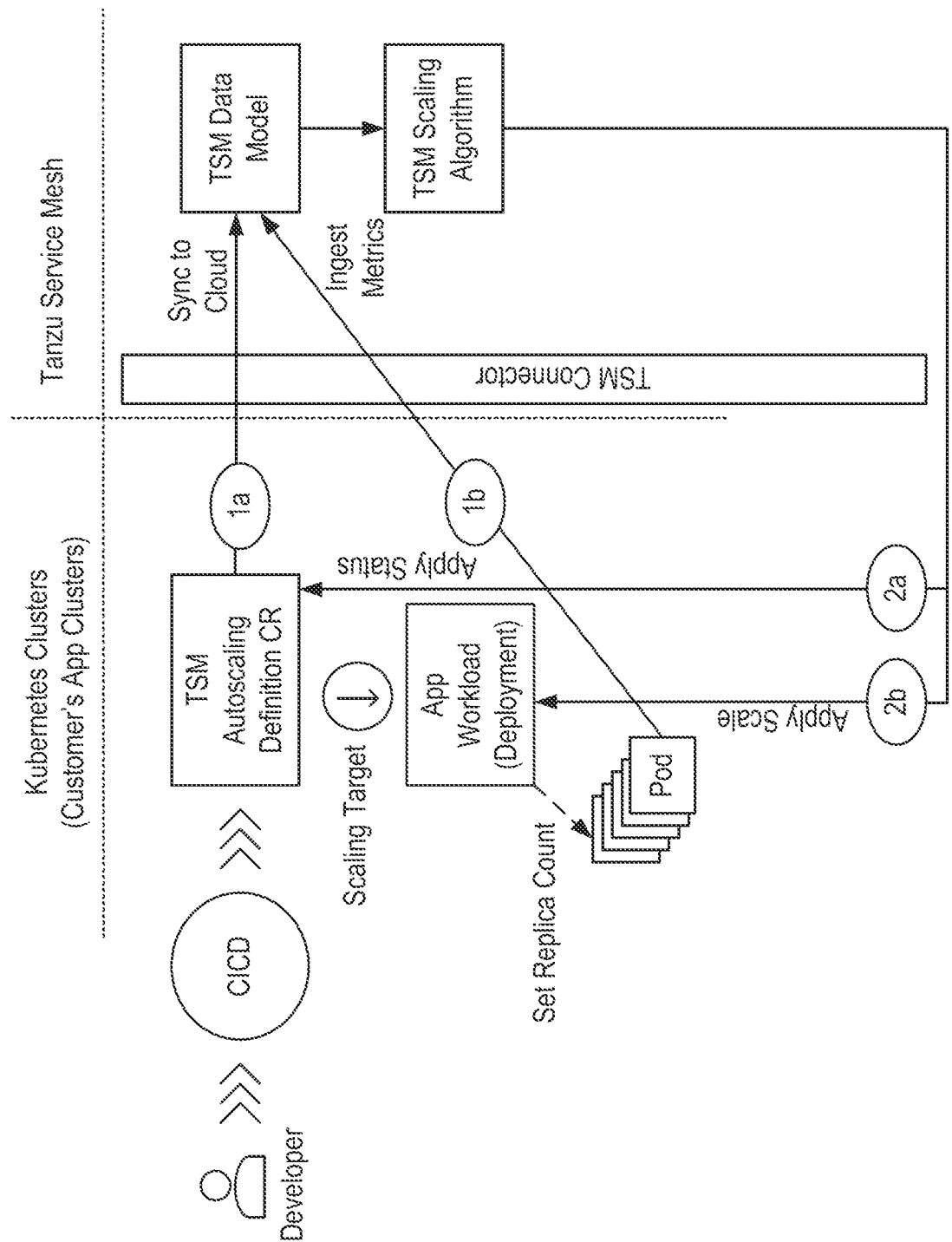
FIG. 6B is a schematic diagram of a cluster scope autoscaling control workflow implemented by an auto-scaler component of the runtime of FIG. 1.

FIG. 6B is a schematic diagram of a cluster scope autoscaling control workflow implemented by an auto-scaler component 502. In the cluster scope, an autoscaling policy applies to the configured service version running in a specified cluster. The runtime 100 provides Kubernetes® custom resource definitions to manage autoscaling policies in cluster scope. On the other hand, in the cluster scoped auto-scaler policy, the policy is applied by the developer using some CICD tool to the target cluster only. In the policy we have the app workload target referenced. The Custom Resource is synced with the data model in the control plane as it starts to ingest metrics from the app workload's pods. The same TSM scaling algorithm, consumes the metrics from the data model and applies scale to the workload in that cluster, along with it also applies the status to the cluster's custom resource.

The runtime 100 can define SLO policy for any service in one of two scope—a GNS scope and an org scope. When created in the GNS scope, the SLO policy applies to the configured service running in any infrastructure underneath the GNS. In this case, the available error budget, as scribed in the SLO policy, is a federated budget across all applicable service members in the GNS. Whenever any of these GNS service members violates any service level indicator (SLI), that contributes to depleting the common federated error budget for the service. The runtime 100 provides API and UI to manage the SLO policies in the GNS scope. When created in the org scope, a SLO policy applies to the configured service running in specified cluster. In this case, the available error budget as scribed in the SLO policy is a federated budget across all versions of the service in the cluster. Whenever any of service versions in the cluster violates any SLI, that contributes to depleting the common federated error budget for the service. The runtime 100 provides API and UI to manage SLO policies in the org scope. Actionable SLO can be configured to trigger certain resiliency function based on the set SLIs. For example, the runtime 100 can trigger autoscaling, descaling, cloudburst, check on capacity available before triggering any action and fire, warning event, and circuit breaking if appropriate. When an actionable SLO is configured to drive service autoscaling in the runtime 100, while processing any autoscaling policies configured for corresponding service versions, the auto-scaler component 502 will monitor the set SLIs in addition to monitoring the trigger metric configured in autoscaling policies and make scaling decisions accordingly.

Returning to FIG. 5, the set 108 includes a de-bloater component 504 that consolidates resource requirements and requests volume across multiple smaller service instances and makes recommendations to reduce the number of instances to a fewer vertically larger service instances. While the policy based auto-scaler component 502 honors the autoscaling policy scribed by developers or operators, the de-bloater component 504 helps to optimize the scaling actions. In addition, the de-bloater component 504 provides recommendations that can be used by the runtime 100 to drive SLO predictions when the recommended instance configurations are applied.

Figure 7:
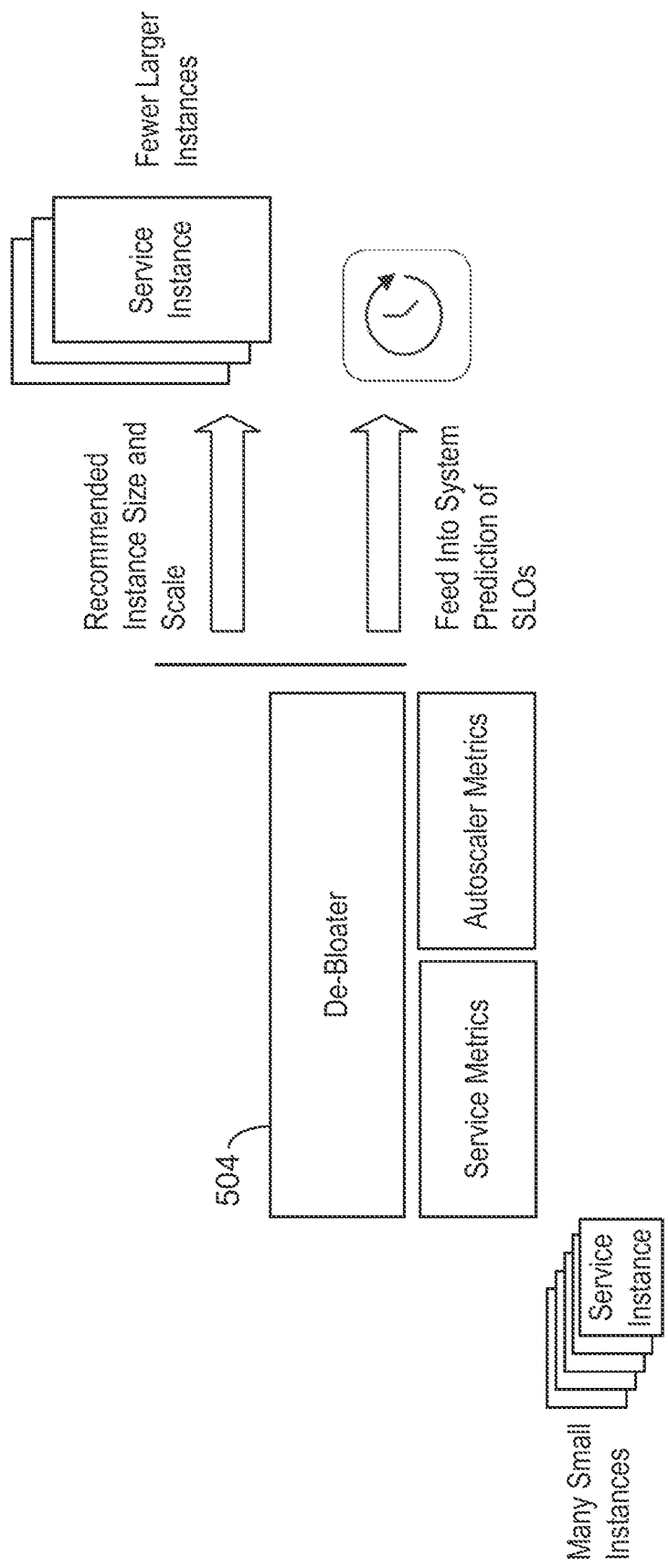
FIG. 7 is a schematic diagram of a workflow of a de-bloater component of the runtime of FIG. 1.

FIG. 7 is a schematic diagram of a workflow of the de-bloater component 504 of the runtime 100 (FIG. 1). In FIG. 7, we have the de-bloater controller which consumes two types of metrics: Service Metrics and Auto-scaler Metrics both of which are derived from Service Instances (typically many small service instances). The de-bloater controller then computes the recommended instance size and instance count (scale) to the Kubernetes controller, to apply the configuration. Additionally, the de-bloater recommendations can be used by the runtime to drive SLO predictions when the recommended instance configuration is applied.

Figure 8:
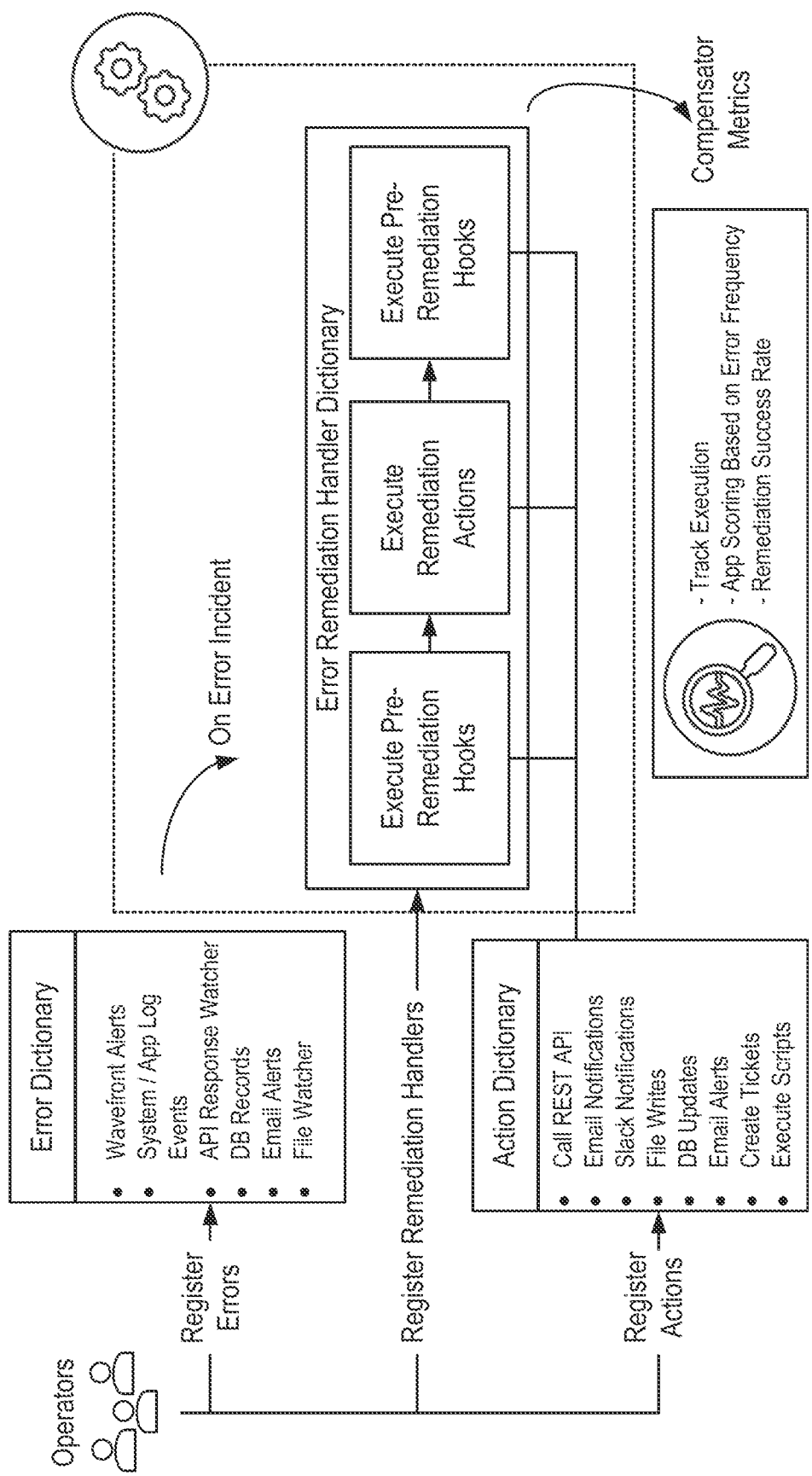
FIG. 8 is a schematic diagram of an architecture of a compensator component of the runtime of FIG. 1.

Returning to FIG. 5, the set 108 includes a compensator component 506 having an architecture schematically shown in FIG. 8. The compensator component 506 consists of 3 major components: Error Dictionary, Action Dictionary and finally the Error Remediation Handler Dictionary. The compensator component 506 can implement a first workflow to register an incident of any supported type. In this workflow, the compensator component 506 identifies an occurrence of an incident and records an error registry. The compensator component 506 can implement a second workflow to register an action of any supported type. In this workflow, the compensator component 506 consumes a remediation action and records it in an action registry. The compensator component 506 can implement a third workflow to register a handler that will wire incidents to its corresponding remediation actions. Remediation actions can be one or a series of actions and can include pre- and post-remediation actions. Once a handler is registered, the compensator component 506 starts to watch for any occurrence of the incident and remediate.

Implementing the compensator component 506 yields certain benefits. For example, service error remediations are usually automation scripts which operators maintain. Such remediations are sometimes kept in source control systems. By registering errors and remediation actions in the compensator component 506, issues with service can be identified as soon as they occur and can be remediated. The compensator component 506 enables proactive and accurate resolution to issues instead of a reactive and error-prone manual intervention. The compensator component 506 maintains metrics, which can help identify system components that encounter errors frequently, such as network errors, storage issues, microservices errors, etc. Applications can be given scores on the premise of error frequency. Such metrics can also be used to drive data analytics and artificial intelligence.

Figure 9:
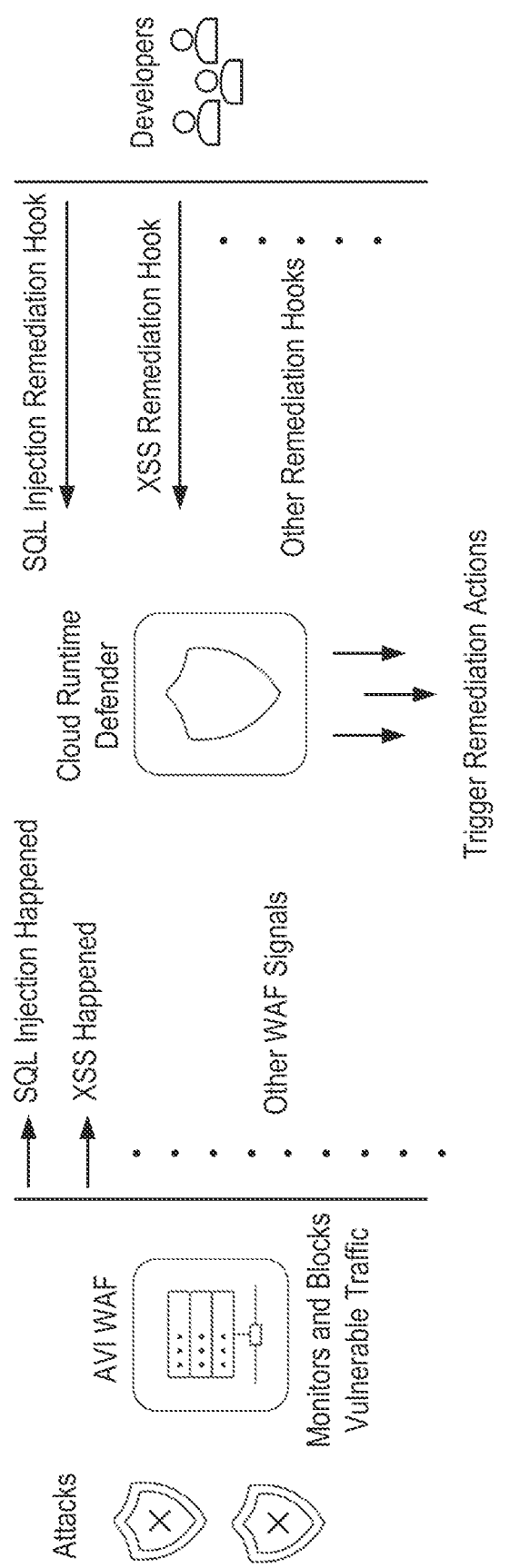
FIG. 9 is a schematic diagram of an architecture of a defender component of the runtime of FIG. 1.

Returning to FIG. 5, the set 108 includes a defender component 508 having an architecture schematically shown in FIG. 9. The defender component 508 allows developers to subscribe to various web app firewall (WAF) signals or alerts arising out of WAF blocking an attack. Developers will be able to hook desired custom remediation actions to such signals to determine the extent of the attack, if any, in the application boundary. In this manner, the defender component 508 helps enhancing application security and resiliency. As an example in FIG. 9, the WAF detects a SQL injection attack and signals it to the defender component 508, which then can trigger a custom remediation script provided by a developer that will check for the existence of application database tables, sanity of rows in the tables, analyze application log entries, generate a report with findings and transmit the report as an email notification attachment.

Figure 10:
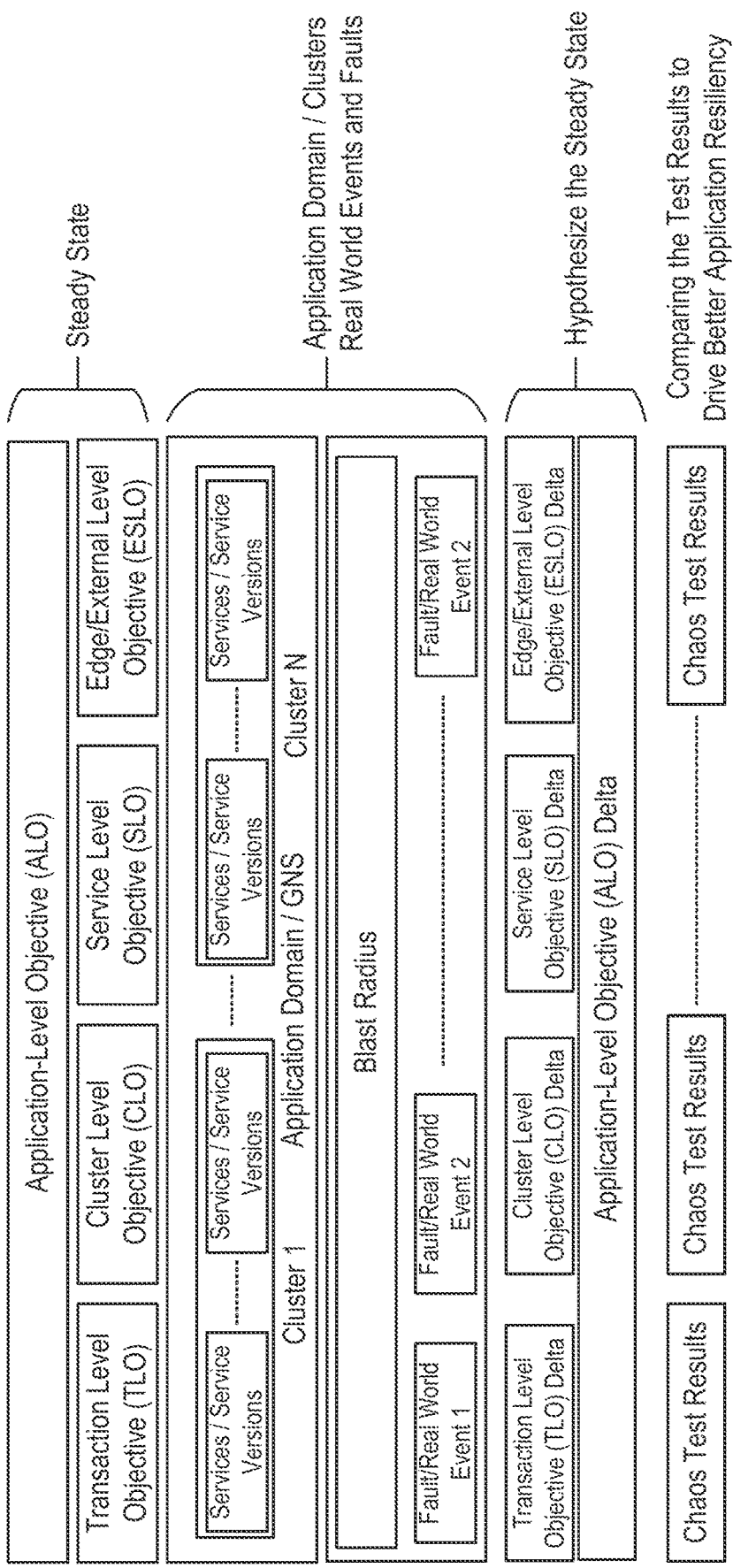
FIG. 10 is a schematic diagram of injecting chaos into the runtime of FIG. 1.

The set 108 includes a testing tools component 510 that can implement tests by introducing chaos and seeing how the runtime 100 responses to the chaos. In some implementations, chaos is included in the application domain (GNS) as the runtime 100 constructs work within the application domain (GNS). FIG. 10 is a schematic diagram of injecting chaos into the runtime 100 (FIG. 1). In some implementations, the component 510 injects chaos while doing a service upgrade rather than when executing a critical scenario to minimize the impact of the injected chaos on the executing scenario.

The testing tools component 510 implements multiple steps in its workflow. In one step, the component 510 defines a steady state by defining the level objectives (Los) for transactions, services, clusters and the application. The LOs define the steady state of the application. In another step, the component 510 hypothesizes the steady state. To do so, the component 510 forms a hypothesis which, upon being introduced into the runtime 100, the expectation is that no anomalies or very few anomalies are introduced into the application. Ideally, this is a delta between the steady state and the expected state under duress. For critical applications with high resiliency, the delta and the steady states should be the same, and the runtime 100 helps to reduce the delta gap between the steady state and the hypothesis. In another step, the component 510 defines the faults/events and the rules under which these should occur. The faults/events include the following: spike in traffic, scaling out/in nodes in a cluster, killing nodes in a cluster, scaling out/in service instances in a cluster/application domain, killing services in a cluster/application domain, injecting a HTTP delay, injecting a HTTP abort, spike in CPU in a cluster/application domain, spike in memory for a cluster/application domain.

To minimize the impact of chaos tests as these tests are carried out in a production environment with actual production traffic, the component 510 can define and implement rules to reduce a blast radius. The rules include cluster level rules. Cluster level rules include node rules, namespace rules, service rules and service version rules. Node rules include a list of nodes where the rule specifies the list of node IDs to inject fault from each of the clusters on which the application is hosted. Node rules also include percentage rules where the rule specifies the percentage number of nodes to inject fault randomly from each of the clusters on which the application is hosted. Name space rules include a list of namespaces where the rule specifies the list of namespaces to inject from each of the clusters on which the application is hosted. The name space rules also includes a random rule that specifies namespaces to inject a fault randomly from each of the clusters on which the application is hosted. Service rules include a list of services where the rule indicates the list of services to inject fault in the cluster. The service rules also include percentage of services where the rule indicates the percentage of services to inject fault randomly in the cluster. The service rules also include tags where the rule lists the tags attached to the services to inject fault in the cluster. Service version rules are useful for service upgrades where a particular service version can be targeted to inject the faults in the cluster.

Along with the cluster level rules, the rules also include node level rules, which include service rules and service version rules. Service rules include a list of services, where the rule indicates the list of services to inject fault in the application domain. The service rules also include percentage of services, where the rule indicates the percentage of services to inject fault randomly in the application domain. The service rules also include tags, where the rule lists the tags attached to the services to inject fault in the application domain. The application-level rules includes service version rules that are useful for service upgrades where a particular service version can be targeted to inject the faults in the application domain.

Figure 11:
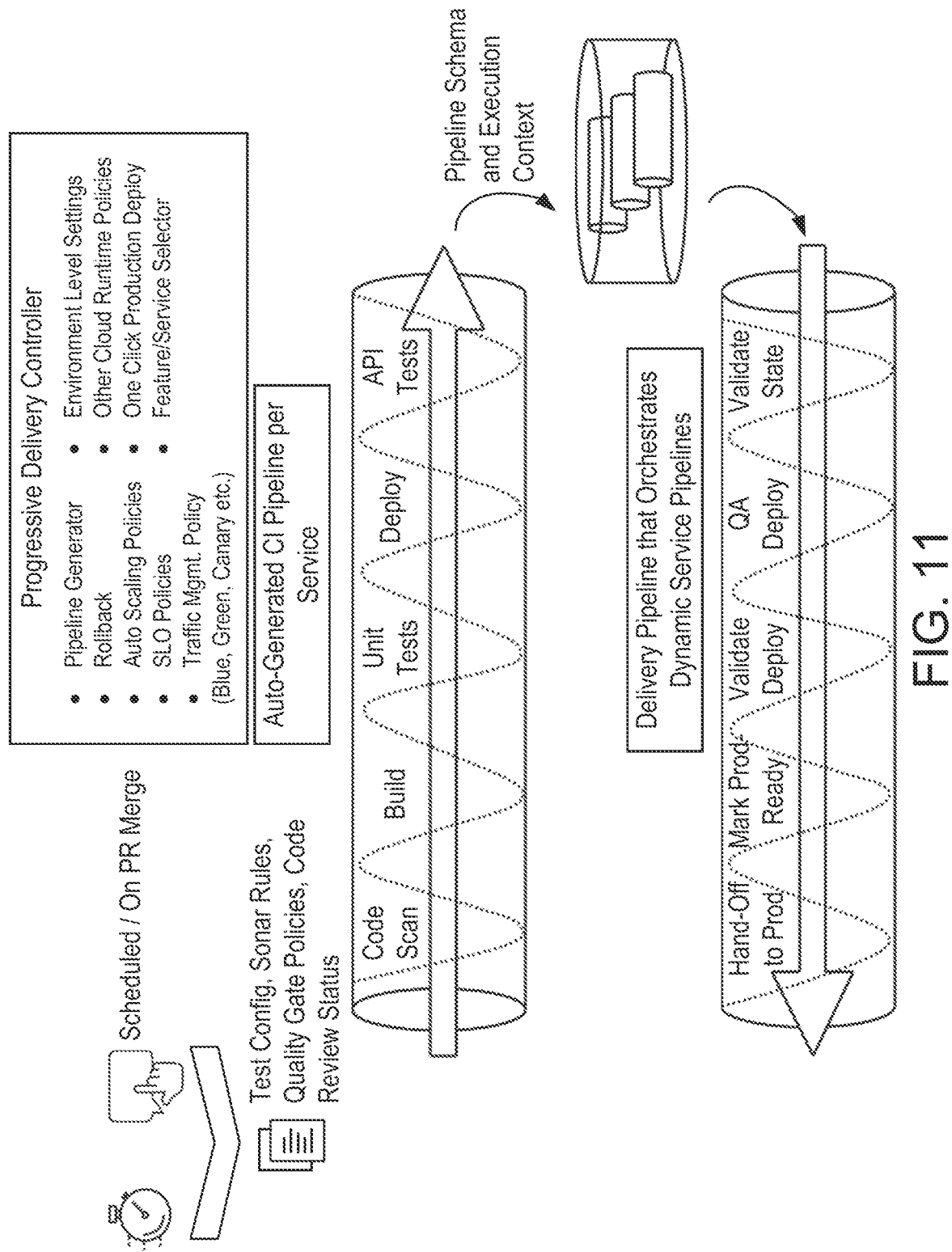
FIG. 11 is a schematic diagram of a workflow of a progressive delivery component of the runtime of FIG. 1.

Returning to FIG. 5, the set 108 includes a progressive delivery component 512. FIG. 11 is a schematic diagram of a workflow of the progressive delivery component 512 of the runtime 100 (FIG. 1). The progressive delivery component 512 is implemented to deploy application services in targeted environments. The component 512 has an opinionated way of doing service deployments covering the following aspects: pipelines; rollbacks, progress; scaling policies; traffic management policies; environment level settings. Progressive delivery controller is based on four pillars: Application/Service as a first class, Opiniated builds and deploys, Observability with integrated actions, Certify application versions for promotions. FIG. 11 explains the workings of Progressive Delivery Controller containing these major CICD steps (in the order they are mentioned):

Auto-generated CI pipeline per service: For a given test config(s), sonar rules, quality gate policies the CI pipeline executes code scans, build, unit tests, deploy and Integration tests.

Delivery pipelines: The CD pipeline validates the state, deploys to a environment, validates the deployment in the environment, and then let's you promote a build to higher environment.

Figure 12:
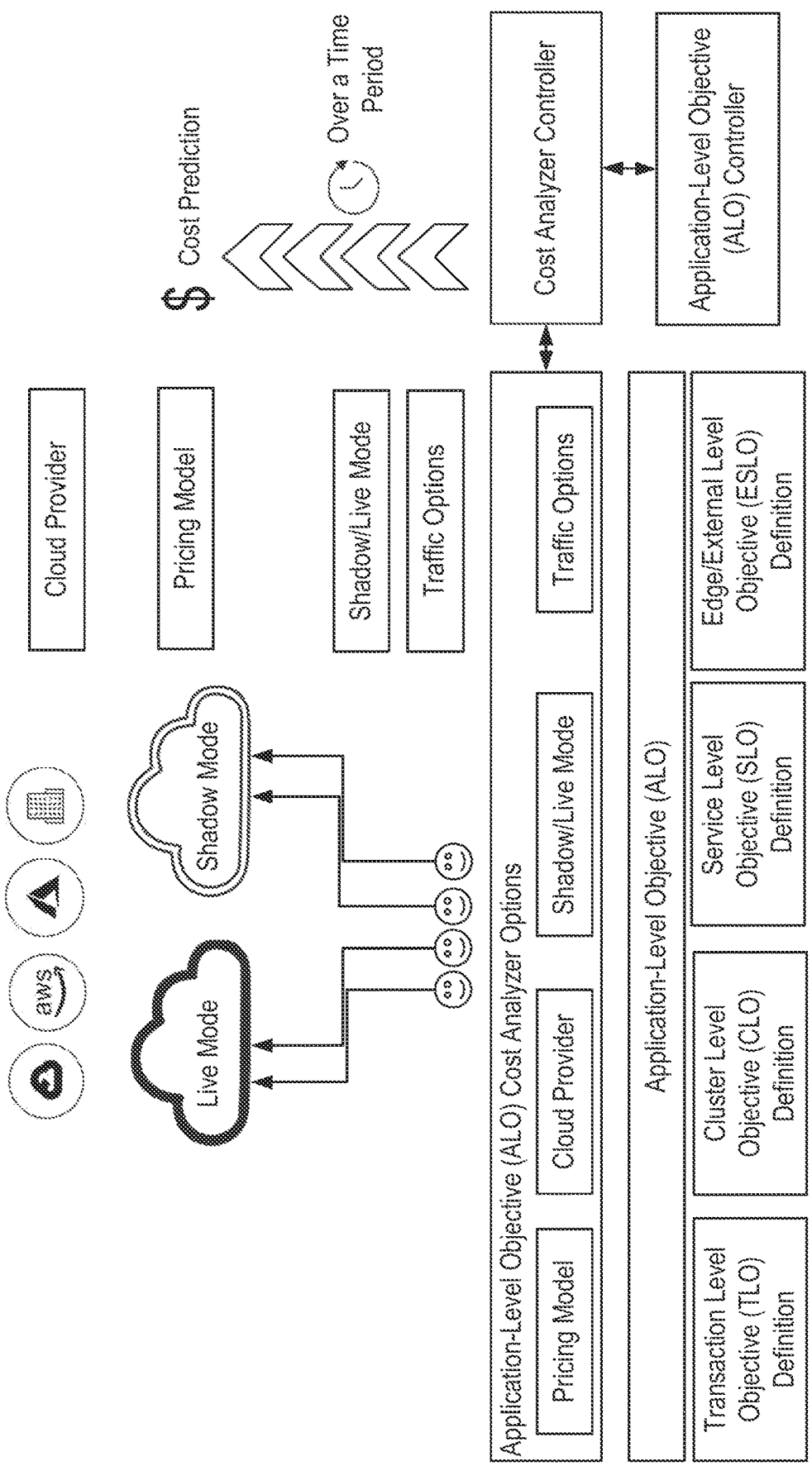
FIG. 12 is a schematic diagram of a cost analyzer component of the runtime of FIG. 1.

Returning to FIG. 5, the set 108 includes a cost analyzer component 514. FIG. 12 is a schematic diagram of the cost analyzer component 514 of the runtime 100 (FIG. 1). The cost analyzer component 514 predicts the cost that will be needed to satisfy the LOs that are defined for the application. The runtime 100 can implement the component 514 in two modes—shadow mode and live mode. In shadow mode, the component 514 creates an exact setup of production and mirrors a part of live traffic to the setup to predict the cost incurred for the setup to make sure that the LOs are satisfied for the given amount of traffic. In live mode, the component 514 does the cost analysis on the live setup to predict the cost that would be incurred to satisfy the LOs. In application-level objective (ALO), the runtime 100 can implement an option to set the cloud provider using which the runtime 100 gets the base prices to make the prediction. FIG. 12 explains the workings of the Cost Analyzer Controller, where it consumes data from the Application-Level Objective (ALO) Controller. This data consists of the ALO indicators and thresholds. The Cost Analyzer Controller will then analyze the metrics it receives (Hardware Consumption, Traffic Patterns) against the Pricing Model, Mode (Shadow/Live), Traffic Options set by the operator against the Cloud Provider's pricing structure. The Cost Analyzer Controller will analyze the data over a period to come up with a Cost Prediction for satisfying the Application-Level Objective.

Returning to FIG. 5, the set 108 includes a green controller component 516 which characterizes power consumption trends by services. Power consumption across all services can be aggregated at the application domain (GNS) level. The component 516 enables measuring energy consumption by applications and enables sustainability awareness among application owners and developers. When the component 516 plots energy consumption metrics in a dashboard, the component 516 displays energy consumed by all applications. In addition, when the component 516 is deployed, the component 516 can scan existing resiliency policies such as autoscaling, cloud burst, etc., and recommend more sustainable policy alternatives, e.g., converting autoscaling policy mode from performance mode to efficiency mode or scheduled mode.

Figure 13:
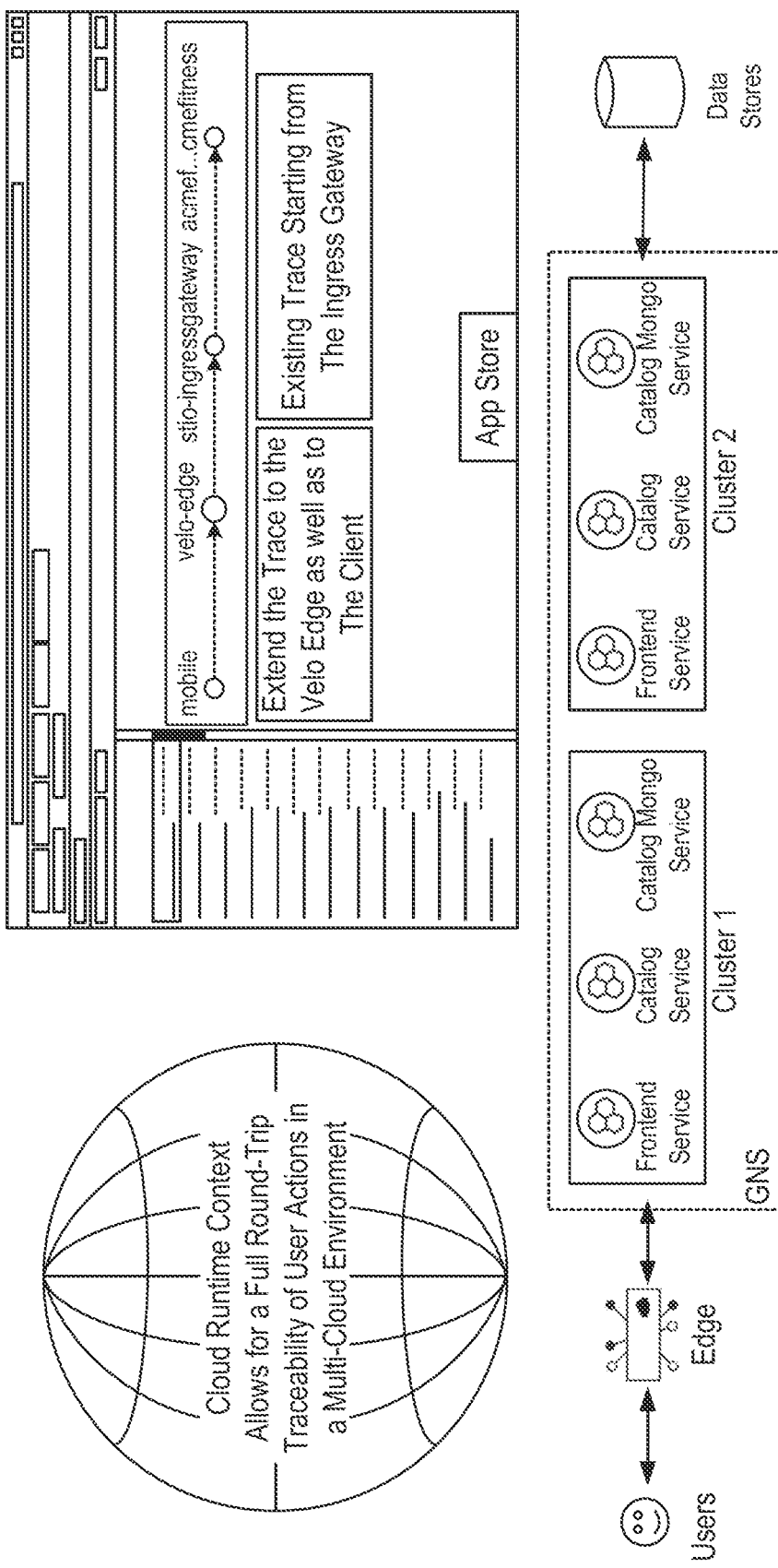
FIG. 13 is a schematic diagram of the deployment of end-to-end traceability by the runtime of FIG. 1.

FIG. 13 is a schematic diagram of the deployment of end-to-end traceability 106 by the runtime 100 (FIG. 1). The end-to-end traceability 106 allows a transaction to be traced right from the end user action trigger, through the edge, and through the multi-cloud/services through which the transaction might be routed. FIG. 13 shows an example of a context that defines such traceability. The figure depicts the application topology in a multi-cloud/cluster environment along with a GNS and leverages Tanzu Observability® for showing the traces to be extended right to the end user trigger. The transaction trace that was captured, extends the trace to the Edge and even to the client where the transaction originated (eg: User Clicking on a Button on the UI/Mobile App). The trace as shown in the below section of FIG. 13, also mentions that it can flow through more than one cluster (eg: a GNS). And hence the Cloud Runtime Context allows for a full round-trip traceability of user actions in a multi-cloud environment.

Figure 14:
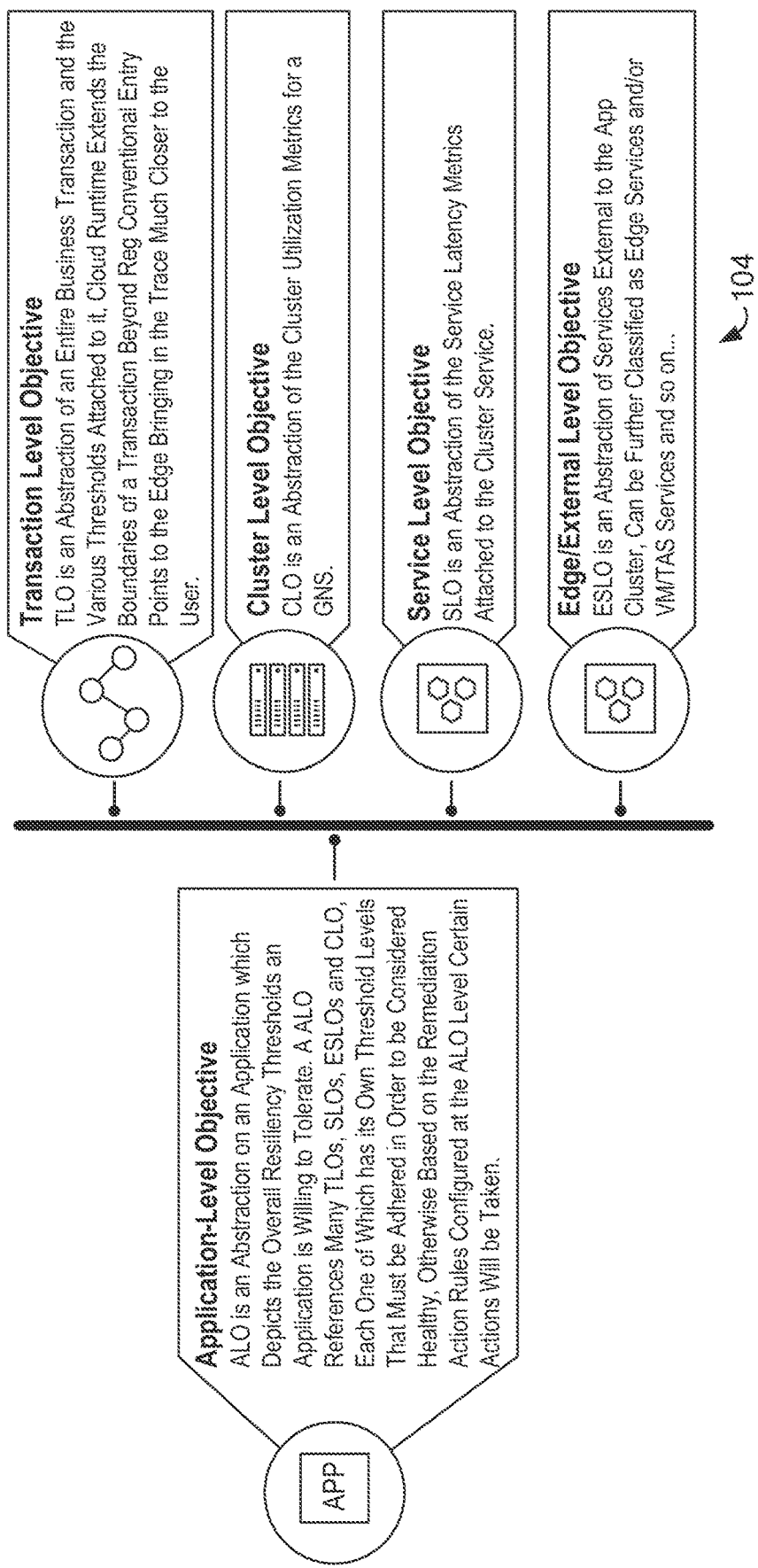
FIG. 14 is a schematic diagram of the deployment of level objectives by the runtime of FIG. 1.

FIG. 14 is a schematic diagram of the deployment of level objectives 104 by the runtime 100 (FIG. 1). An application deployed by the runtime 100 can have one top level ALO that depicts the overall resiliency thresholds that the application can tolerate. As shown in FIG. 14, the ALO can contain a reference to multiple objectives including a transaction level objective (TLO), a SLO, and a cluster level objective (CLO). Each one of these objectives has its own threshold levels to which the runtime 100 must adhere to be considered healthy. Otherwise, remediating action rules configured at the ALO level are implemented. In some cases, the remediating action can be implemented at the individual objective level. Remediating actions can be any of cluster bursting, autoscaling (at SLO level), DR activation, circuit breaking, retrying, rate limiting or a combination of any of them.

Certain aspects of the subject matter described here can be implemented as a computer-implemented method to deploy a runtime to execute a cloud infrastructure. During deployment of an application service by the cloud infrastructure, each action implemented in the cloud infrastructure is traced, from an initiation of the application service to a termination of the application service. Level objectives associated with the cloud infrastructure and associated with the application service deployed by the cloud infrastructure are tracked. In response to tracing an action implemented in the cloud infrastructure and in response to tracking the level objectives, a scaling decision associated with the application service is determined. The scaling decision incudes either an upscaling or a downscaling. In response to determining the scaling decision, the scaling decision is implemented to match the level objectives associated with the cloud infrastructure and associated with the application service.

An aspect combinable with any other aspect includes the following features. The application service is deployed as multiple service instances across the cloud infrastructure. In response to tracing each action implemented in the cloud infrastructure during deployment, and in response to tracking level objectives, volume requests across the multiple service instances are identified. Resource requirements are consolidated across the cloud infrastructure. Recommendations to reduce a number of the multiple service instances to a comparatively smaller number of larger service instances are provided. Each larger service instance includes at least two service instances of the multiple service instances.

An aspect combinable with any other aspect includes the following features. Incidents that arise during deployment of the application service by the cloud infrastructure are detected. The incidents are registered in one of multiple registries including an error registry that registers occurrence of errors and a remediation action registry that includes instructions on executing remediation actions in response to errors.

An aspect combinable with any other aspect includes the following features. A handler component, which is configured to wire each incident to a remediation action, is deployed responsive to the occurrence of the incident.

An aspect combinable with any other aspect includes the following features. While the cloud infrastructure deploys the application service, an alert, which is associated with a firewall attack on the application service, is received. In response to receiving the alert, custom remediation actions, which are established by an application service developer, are identified. The custom remediation action is deployed. The custom remediation action is configured to determine an extent of the firewall attack on an application boundary of the application service.

An aspect combinable with any other aspect includes the following features. A chaos component is injected into the application service during deployment of the application service by the cloud infrastructure. The chaos component causes a deviation of operation of the application service. In response to injecting the chaos component, the deviation of the operation of the application service is determined.

An aspect combinable with any other aspect includes the following features. The chaos component is injected during an application service upgrade and not during regulation operation of the application service.

An aspect combinable with any other aspect includes the following features. During deployment of the application service by the cloud infrastructure, power consumption trends of the cloud infrastructure are tracked by measuring power consumption by the application service.

Certain aspects of the subject matter described in this disclosure can be implemented as a system that includes one or more processors including a hardware-based processor, and a memory storage including a non-transitory computer-readable medium storing instructions which, when executed by the one or more processors including the hardware-based processor, to perform operations including the methods described in this disclosure.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:

1. A computer-implemented method to deploy a runtime to execute a cloud infrastructure, the method comprising:
   tracing each action implemented in the cloud infrastructure during deployment, by the cloud infrastructure of an application service, from an initiation of the application service to a termination of the application service;
   tracking level objectives associated with the cloud infrastructure and associated with the application service deployed by the cloud infrastructure;
   in response to tracing an action implemented in the cloud infrastructure and in response to tracking the level objectives, determining a scaling decision associated with the application service, the scaling decision comprising either an upscaling or a downscaling;
   in response to determining the scaling decision, implementing the scaling decision to match the level objectives associated with the cloud infrastructure and associated with the application service;
   receiving an alert associated with a firewall attack on the application service; and
   in response to receiving the alert:
   identifying custom remediation actions established by an application service developer; and
   deploying the custom remediation action, wherein the custom remediation action is configured to determine an extent of the firewall attack on an application boundary of the application service.

2. The method of claim 1, wherein the application service is deployed as a plurality of service instances across the cloud infrastructure, wherein the method further comprises, in response to tracing each action implemented in the cloud infrastructure during deployment, and in response to tracking level objectives:
   identifying volume requests across the plurality of service instances;
   consolidating resource requirements across the cloud infrastructure; and
   providing recommendations to reduce a number of the plurality of service instances to a comparatively smaller number of larger service instances, wherein each larger service instance comprises at least two service instances of the plurality of service instances.

3. The method of claim 1, further comprising:
   detecting incidents that arise during deployment of the application service by the cloud infrastructure; and
   registering the incidents in one of a plurality of registries comprising an error registry that registers occurrence of errors and a remediation action registry that comprises instructions on executing remediation actions in response to errors.

4. The method of claim 3, further comprising deploying a handler component configured to wire each incident to a remediation action executable responsive to the occurrence of the incident.

5. The method of claim 1, further comprising:
   consuming, by a de-bloater component, a plurality of service metrics and auto-scaler metrics derived from a plurality of service instances;
   based on the consumed metrics, computing a recommended instance size and a recommended instance count to consolidate the plurality of service instances into a smaller number of larger service instances; and
   providing the recommended instance size and recommended instance count to a controller to apply a new configuration.

6. The method of claim 1, further comprising:
   injecting a chaos component into the application service during deployment of the application service by the cloud infrastructure, wherein the chaos component causes a deviation of operation of the application service; and
   in response to injecting the chaos component, determining the deviation of the operation of the application service.

7. The method of claim 6, wherein the chaos component is injected during an application service upgrade and not during regular operation of the application service.

8. The method of claim 1, further comprising, during deployment of the application service by the cloud infrastructure, tracking power consumption trends of the cloud infrastructure by measuring power consumption by the application service.

9. A non-transitory computer-readable medium storing instructions which, when executed by a hardware-based processor, performs operations comprising:
- tracing each action implemented in the cloud infrastructure during deployment, by the cloud infrastructure of an application service, from an initiation of the application service to a termination of the application service;
- tracking level objectives associated with the cloud infrastructure and associated with the application service deployed by the cloud infrastructure;
- in response to tracing an action implemented in the cloud infrastructure and in response to tracking the level objectives, determining a scaling decision associated with the application service, the scaling decision comprising either an upscaling or a downscaling;
- in response to determining the scaling decision, implementing the scaling decision to match the level objectives associated with the cloud infrastructure and associated with the application service;
- receiving an alert associated with a firewall attack on the application service; and
- in response to receiving the alert:
  - identifying custom remediation actions established by an application service developer; and
  - deploying the custom remediation action, wherein the custom remediation action is configured to determine an extent of the firewall attack on an application boundary of the application service.

10. The medium of claim 9, wherein the application service is deployed as a plurality of service instances across the cloud infrastructure, wherein the operations further comprise, in response to tracing each action implemented in the cloud infrastructure during deployment, and in response to tracking level objectives:
- identifying volume requests across the plurality of service instances;
- consolidating resource requirements across the cloud infrastructure; and
- providing recommendations to reduce a number of the plurality of service instances to a comparatively smaller number of larger service instances, wherein each larger service instance comprises at least two service instances of the plurality of service instances.

11. The medium of claim 9, wherein the operations further comprise:
- detecting incidents that arise during deployment of the application service by the cloud infrastructure; and
- registering the incidents in one of a plurality of registries comprising an error registry that registers occurrence of errors and a remediation action registry that comprises instructions on executing remediation actions in response to errors.

12. The medium of claim 11, wherein the operations further comprise deploying a handler component configured to wire each incident to a remediation action executable responsive to the occurrence of the incident.

13. The medium of claim 9, wherein, the operations further comprising:
- consuming, by a de-bloater component, a plurality of service metrics and auto-scaler metrics derived from a plurality of service instances;
- based on the consumed metrics, computing a recommended instance size and a recommended instance count to consolidate the plurality of service instances into a smaller number of larger service instances; and
- providing the recommended instance size and recommended instance count to a controller to apply a new configuration.

14. The medium of claim 9, wherein the operations further comprise:
- injecting a chaos component into the application service during deployment of the application service by the cloud infrastructure, wherein the chaos component causes a deviation of operation of the application service; and
- in response to injecting the chaos component, determining the deviation of the operation of the application service.

15. The medium of claim 14, wherein the chaos component is injected during an application service upgrade and not during regular operation of the application service.

16. The medium of claim 9, wherein the operations further comprise, during deployment of the application service by the cloud infrastructure, tracking power consumption trends of the cloud infrastructure by measuring power consumption by the application service.

17. A system comprising:
- one or more processors including a hardware-based processor; and
- a memory storage including a non-transitory computer-readable medium storing instructions which, when executed by the one or more processors including the hardware-based processor, performs operations comprising:
  - tracing each action implemented in the cloud infrastructure during deployment, by the cloud infrastructure of an application service, from an initiation of the application service to a termination of the application service;
  - tracking level objectives associated with the cloud infrastructure and associated with the application service deployed by the cloud infrastructure;
  - in response to tracing an action implemented in the cloud infrastructure and in response to tracking the level objectives, determining a scaling decision associated with the application service, the scaling decision comprising either an upscaling or a downscaling;
  - in response to determining the scaling decision, implementing the scaling decision to match the level objectives associated with the cloud infrastructure and associated with the application service;
  - receiving an alert associated with a firewall attack on the application service; and
  - in response to receiving the alert:
    - identifying custom remediation actions established by an application service developer; and
    - deploying the custom remediation action, wherein the custom remediation action is configured to determine an extent of the firewall attack on an application boundary of the application service.

18. The system of claim 17, wherein the application service is deployed as a plurality of service instances across the cloud infrastructure, wherein the operations further comprise, in response to tracing each action implemented in the cloud infrastructure during deployment, and in response to tracking level objectives:
- identifying volume requests across the plurality of service instances;
- consolidating resource requirements across the cloud infrastructure; and
- providing recommendations to reduce a number of the plurality of service instances to a comparatively smaller number of larger service instances, wherein each larger service instance comprises at least two service instances of the plurality of service instances.

19. The system of claim 17, wherein the operations further comprise:
    detecting incidents that arise during deployment of the application service by the cloud infrastructure; and
    registering the incidents in one of a plurality of registries comprising an error registry that registers occurrence of errors and a remediation action registry that comprises instructions on executing remediation actions in response to errors.

20. The system of claim 17, the operations further comprising:
    consuming, by a de-bloater component, a plurality of service metrics and auto-scaler metrics derived from a plurality of service instances;
    based on the consumed metrics, computing a recommended instance size and a recommended instance count to consolidate the plurality of service instances into a smaller number of larger service instances; and
    providing the recommended instance size and recommended instance count to a controller to apply a new configuration.

* * * * *